United States Patent [19]

Nagumo et al.

[11] 4,355,327
[45] Oct. 19, 1982

[54] DIGITAL COLOR ENCODER

[75] Inventors: Fumio Nagumo, Yokohama; Takashi Asaida, Atsugi, both of Japan

[73] Assignee: Sony Corporation, Tokyo, Japan

[21] Appl. No.: 231,440

[22] Filed: Feb. 4, 1981

[30] Foreign Application Priority Data

Jan. 31, 1980 [JP] Japan .................................. 55-10672

[51] Int. Cl.³ ........................ H04N 9/07; H04N 9/18
[52] U.S. Cl. ......................................... 358/44; 358/13
[58] Field of Search ....................... 358/11, 12, 13, 16, 358/18, 41, 44, 50

[56] References Cited

U.S. PATENT DOCUMENTS

| | | | |
|---|---|---|---|
| 3,946,434 | 3/1976 | Shimada | 358/44 |
| 4,258,384 | 3/1981 | Tatami | 358/16 |
| 4,288,810 | 9/1981 | Drewery | 358/16 |

FOREIGN PATENT DOCUMENTS 1428206  3/1976  United Kingdom .................. 358/13

OTHER PUBLICATIONS

Digital Processing Amplifier and Color Encoder, by Eto, et al., SMPTE Journal, vol. 87, No. 1, Jan. 1978, p. 15-19.

Primary Examiner—Tommy P. Chin
Attorney, Agent, or Firm—Hill, Van Santen, Steadman, Chiara & Simpson

[57] ABSTRACT

A digital color encoder for a television camera in which during digitally modulating a carrier of $3f_{sc}$ ($f_{sc}$ is a color subcarrier frequency) with a digital color signal which is obtained by sampling input video information data at a sampling pulse rate having a frequency of $3(n/m)f_{sc}$ (with m and n being relatively small integers) at N line the digital color signal is amplitude modulated by 3-phase modulation vectors each having a phase difference of $\frac{2}{3}\pi$ from each other so as to produce a digitally modulated color signal. At N+1 line, the digital color signal is amplitude modulated by the 3-phase modulation vectors each having a phase opposite to that at the N line so as to produce an output of N+1 line which is then phase inverted to provide a digital modulated color signal. Thus, a digital color television signal with color phase having the standard television signal format is obtained.

6 Claims, 13 Drawing Figures

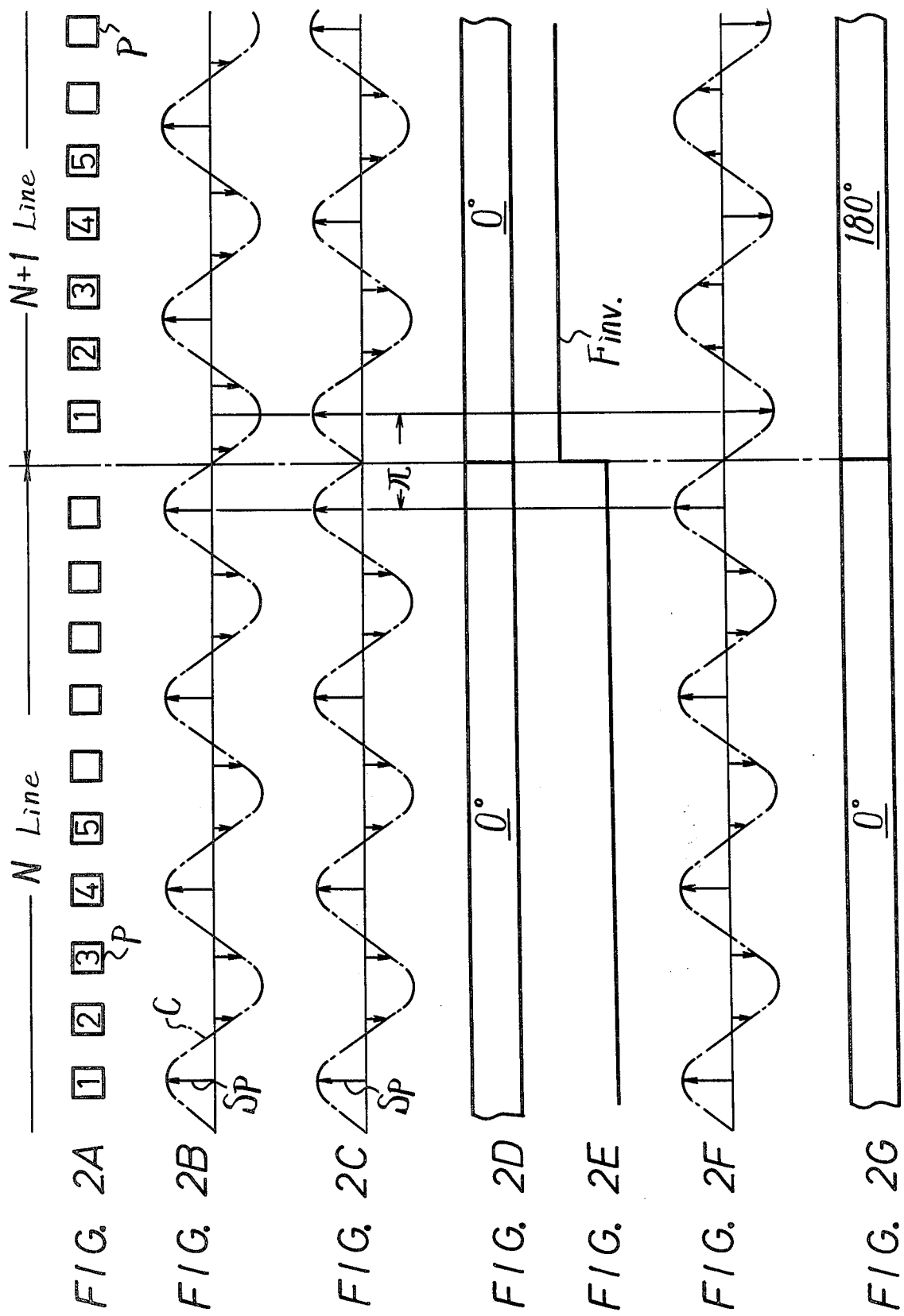

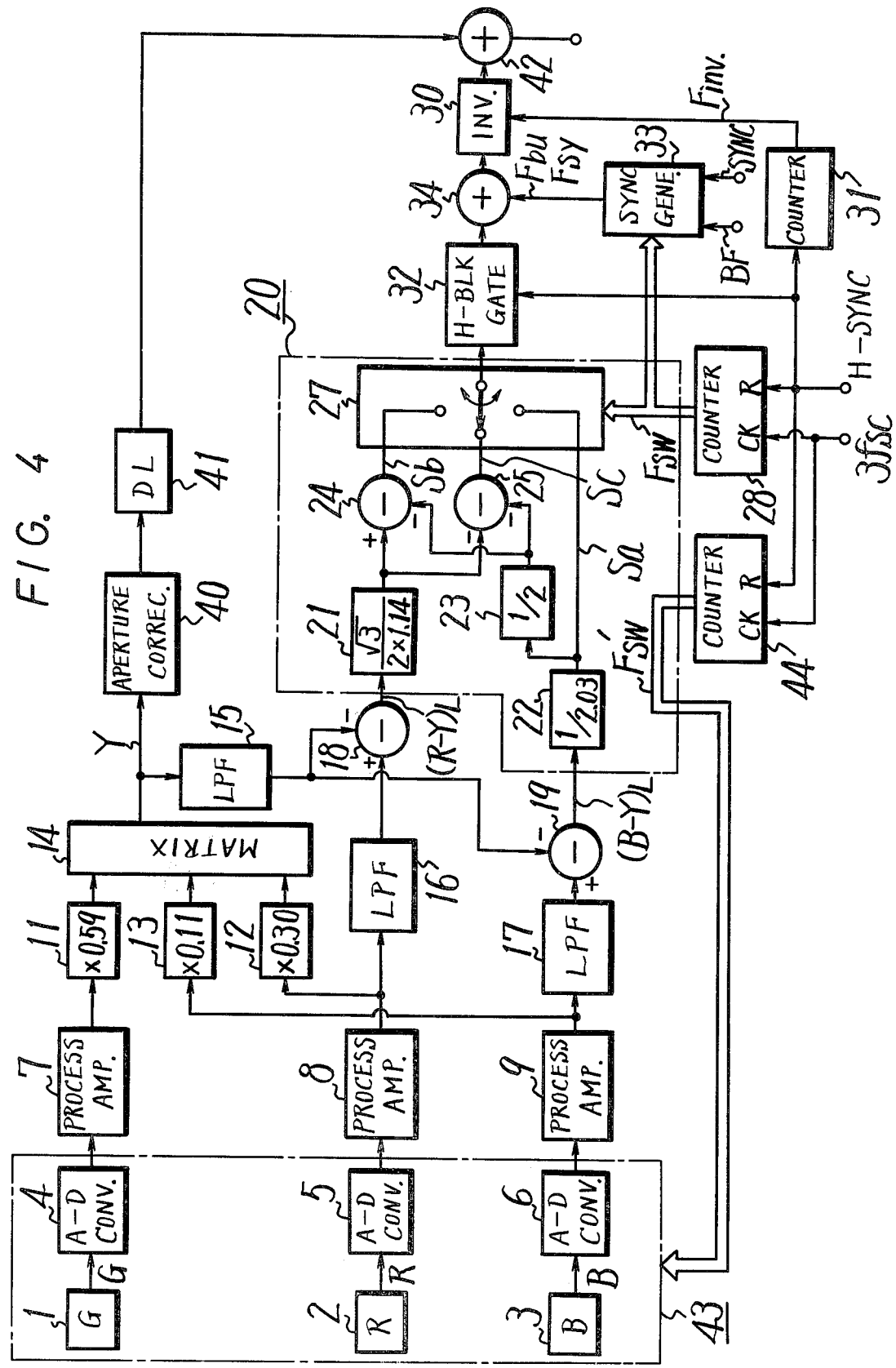

DIGITAL COLOR ENCODER

BACKGROUND OF THE INVENTION

1. Field of the Invention

This invention relates to a digital color encoder for use in color television equipment using a solid stage image pickup such as a charge coupled device.

2. Description of the Prior Art

In the case where image pickup outputs obtained from, for example, a charge coupled device (CCD) are digitally processed to produce a digital color television signal and a rate of three times the color subcarrier frequency $f_{sc}$ is selected during the modulation process of the digital color signal and the digital modulated color signal corresponding to a chrominance signal is produced in the following process.

In other words, the digital modulated color signal is composed of three vectors $\vec{a}$, $\vec{b}$ and $\vec{c}$ having phase differences of $\frac{2}{3}\pi$ from each other as illustrated in FIG. 1A. Therefore, the red, green and blue primary color signals R, G and B are digitally processed so as to have absolute values of vectors such as U, $((\sqrt{3}/2)V - \frac{1}{2}U)$, and $(-(\sqrt{3}/2)V - \frac{1}{2}U)$ as illustrated. Thereafter, they are sequentially switched every $\frac{1}{3}f_{sc}$, which is the processing rate of the color encoder to convert the respective vector components to time series mode. Thus, the digital color signal is amplitude modulated with three phase modulating vectors to produce a desired digital modulated color signal.

The picture elements of the CCD used as the solid state image pickup device are normally arranged linearly in the vertical direction. When a signal of $3f_{sc}$ (in general, $n/m \times 3f_{sc}$ where m and n are relatively small integers) is used as the sampling signal supplied to the CCD, since this frequency is selected to be an odd number times as great as $\frac{1}{2}f_H$ ($f_H$ is a horizontal frequency), or selected to be $3f_{sc} = 3 \times (455/2)f_H$, a $\frac{1}{2}$ offset occurs between horizontal lines. Accordingly, if the sampling signal is a continuous wave the relationship between the picture elements and the phase of the sampling pulses is as shown in FIGS. 2A and 2B. The phase of the sampling pulses can be defined as the phase of the read-out clock of the picture signals projected on the picture elements of the CCD chip.

If the relative relation between the picture elements p and the sampling pulses $S_p$ at, for example, N line is as illustrated in FIGS. 2A and 2B, the relative positional relation between the picture elements p and the sampling pulses $S_p$ at N+1 line will be shifted by $\pi$. Thus, with this relative positional relationship, it is impossible for the information of the picture elements at N+1 line to be sampled to produce a normal video signal. As a result, it is desirable that the sampling pulses supplied to the respective picture elements of the CCD be reset at every other line so that the sampling phases are in-phase with the picture element arrangement even at N+1 line (FIG. 2C). In other words, it is also desirable that at N line and at N+1 line, the phase of the sampling pulses $S_p$ be arranged to always appear at the relative positions of the respective picture elements 1, 2, 3 . . . .

FIG. 3 is a view illustrating the relative positional relationship among picture elements p of CCD chip 1, the sampling carrier c having a frequency of $3f_{sc}$ and the sampling point s. It can be observed that at N line and at N+1 line, the position of the sampling point or the sampling timing s is changed so that at N+1 line the picture of each element will not be picked up.

In the case of sampling the information of the picture elements with phases of sampling pulses which are coincidence between the N and N+1 lines using the resetting operation discussed above as shown in FIG. 2C, when the sampling phase at, for example, N line coincides with the phase of the modulating color vector shown by the solid line in FIG. 1B, since at N+1, the sampling phase is shifted by $\pi$ relative to the continuous phase of the N line, the phase of the modulating vector at that time will become opposite and the continuity of the sampling phase disappears as is illustrated in FIG. 1B by broken lines. In this case, it can be observed that the phases of the sampling signals of the picture elements at N line and at N+1 line coincide with each other between the respective lines but the continuity of the sampling signals between the respective lines, is inverted by 180°. Accordingly, the phase of the chroma signal modulated by the sampling carrier illustrated in FIG. 2C is different from the phase mode of the color subcarrier signal which is the ideal sampling mode of the NTSC television system so that the desired digital modulated color signal cannot be obtained under the above conditions.

FIGS. 2D and 2G respectively correspond to FIGS. 2C and 2F and show the chroma phase of adjacent horizontal lines in the case when it is assumed that the chroma phase of the same picture elements is 0°. It can be observed that the phase relationship illustrated in FIG. 2G is a so-called offset carrier of 0° and 180° of the NTSC space TV signal.

SUMMARY OF THE INVENTION

It is an object of this invention that even though the phases of the sampling pulses at the different lines changes or is made in phase accordance to the method of arranging the picture elements, a predetermined digital modulation output can be obtained.

It is an object of this invention to provide a digital color encoder suitable for a solid state color television camera using CCD chips.

In detail, when a carrier having a frequency of three times the color subcarrier is modulated by a digital chroma signal and then added to a digital luminance signal, such addition is made after the modulated subcarrier has the phase mode of the NTSC chroma subcarrier.

Thus, it is another object of this invention to provide a digital color television camera in which a CCD chip is driven by a signal having a phase corresponding to the position of each picture element of the CCD chip, that is, the phase of the sampling signal supplied to the CCD chip is always the same at respective lines (N, N+1, N+2 . . .), and after the digital color signal is modulated with the three phase modulating axes in synchronism with the phase of the sampling signal applied to the CCD, the phase of the modulation color signal is inverted by 180° at every other horizontal line interval so as to obtain a signal having the modulating color phase of the NTSC signal.

The above and other objects and features and advantages of the invention will become apparent from the following description when read in view of the accompanying drawings in which:

BRIEF DESCRIPTION OF THE DRAWINGS

FIGS. 2A through 2G are plots illustrating the relationship between the picture elements and the phase of the sampling pulses;

FIG. 4 is a block diagram illustrating one example of a digital color encoder according to this invention;

DETAILED DESCRIPTION OF THE PREFERRED EMBODIMENTS

Figure 1A:
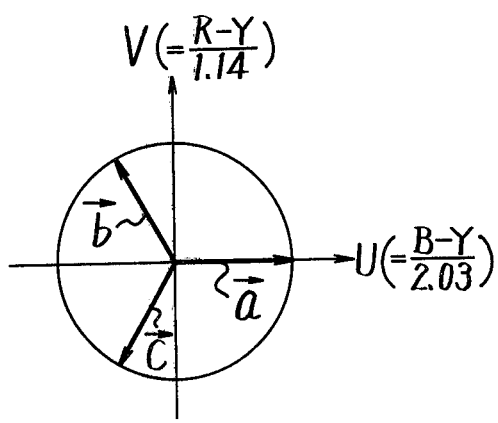
FIGS. 1A and 1B are plots illustrating 3-phase modulating vectors.

FIG. 4 illustrates an embodiment of the invention wherein a 3-chip type color television operates at a $3f_{sc}$ sampling rate.

As shown in FIG. 4, the green, red and blue primary color signals G, R and B are derived from the pickup devices such as CCDs 1, 2 and 3 and the outputs are respectively supplied to analog to digital converters 4, 5 and 6 where the signals are converted to coded digital color signals. The digital color signals are then supplied to processing circuits 7, 8 and 9 where they are subjected to various processes such as the γ-correction, white clip and so forth. The processed digital color signals are then supplied to weighting circuits 11, 12 and 13 each of which is comprised of a multiplier where they are subjected to the weighting process required for the NTSC system. Then the signals are fed to a matrix or mixer 14 to produce a digital luminance signal Y.

The digital luminance signal Y is supplied to a low pass filter 15 where it is band-limited. The red and blue digital color signals are also band-limited by low-pass filters 16 and 17 which are connected to the output of the process amplifiers 8 and 9. The signals from the low-pass filters 15 and 16 are applied to a subtractor 18 so as to derive a digital red color difference signal $(R-Y)_L$, and the signals from the low-pass filters 15 and 17 are applied to another subtractor 19 to derive a digital blue color difference signal $(B-Y)_L$.

A signal obtained by multiplying the digital color difference signal $(R-Y)_L$ by a compression coefficient of 1/1.14 is taken as the V-axis signal and a signal obtained by multiplying the digital color difference signal $(B-Y)_L$ by the compression coefficient of 1/2.03 is taken as the U-axis signal. These V-axis and U-axis signals are converted to components on the modulation axes having a phase difference of $\frac{2}{3}\pi$ between adjacent signals as shown in FIG. 1A so as to form a digital modulation output.

In FIG. 1A, a modulation vector $\vec{a}$ is aligned with the U-axis which is taken as the reference axis. Three-phase modulation vectors $\vec{a}$, $\vec{b}$ and $\vec{c}$ and each indicating absolute values have a phase difference of $\frac{2}{3}\pi$ between adjacent vectors and can be expressed by using the V-axis and the U-axis signals as follows:

$$\vec{a} = U \tag{1}$$

$$\vec{b} = \frac{\sqrt{3}}{2} V - \tfrac{1}{2} U \tag{2}$$

$$\vec{c} = -\frac{\sqrt{3}}{2} V - \tfrac{1}{2} U \tag{3}$$

As a result, a digital color modulating circuit 20 such as shown in FIG. 4, results in which the three-phase modulation vectors are amplitude modulated by the digital color difference signals $(R-Y)_L$ and $(B-Y)_L$ to obtain a digital modulated color signal.

In the modulating circuit 20, a coefficient circuit 21 is utilized for obtaining a signal component $(\sqrt{3}/2)V$ on the V axis and receives the output of the subtractor 18. A coefficient circuit 22 for obtaining a U-axis signal receives the output of the subtractor 19 and a coefficient circuit 23 receives the output of the circuit 22 and obtains a signal component of $\tfrac{1}{2} U$ on the U-axis. The signal components $(\sqrt{3}/2)V$ and $\tfrac{1}{2} U$ on the V-axis and the U-axis are respectively supplied to subtractors 24 and 25 so as to derive a digital primary color signal component $S_B$ relating to the modulation vector $\vec{b}$ and a signal component $S_C$ relating to the modulation vector $\vec{c}$ respectively. A digital primary color signal component $S_a$ relating to the modulation vector $\vec{a}$ is the output of the coefficient circuit 22. Each of the signal components $S_a$, $S_b$ and $S_c$ have amplitude components only and no phase components.

The signal components $S_a$, $S_b$ and $S_c$ are sequentially switched with a switching circuit 27 which has a period of $\tfrac{1}{3}f_{sc}$ to form a signal having a time series of $\tfrac{1}{3}f_{sc}$. This time series signal is a digital modulated color signal. A switching pulse $F_{SW}$ is a 2-bit pulse modulated from a ternary counter 28 which receives a clock signal of $3f_{sc}$ and controls the switching circuit 27. The counter 28 is reset by a horizontal synchronizing signal H-SYNC. Resetting the counter 28 with the signal H-SYNC is done so as to match the phase of the switching pulse $F_{SW}$ withe the phase of a sampling pulse Sp which is used to sample signals from the charge coupled devices 1, 2 and 3.

Another ternary counter 44 provides an output in synchronism with the output of the counter 28. The output pulse $F'_{SW}$ of the counter 44 is applied to a digital signal producing system 43 for example, which has a sampling frequency of $3f_{sc}$ to drive the CCDs 1, 2 and 3 and the analog to digital converters 4, 5 and 6. Thus, when this system 43 does not have a sampling rate of $3f_{sc}$, the clock signal $F'_{SW}$ is applied to it.

If the phase of the switching pulse $F_{SW}$ is matched to the phase of the sampling pulse, the phase of the modulation vector at even numbered lines (N) is inverted relative to the phase of the modulation vector at odd numbered lines (N+1) and the phase of the time series signal after the switching process will also be inverted between adjacent lines. Thus, so as to coincide with the phase of the color subcarrier of the standard television signal, the time series signal is supplied to a phase inverter 30 to perform phase inversion at every horizontal period (1H). The phase inverter 30 is composed of a multiplier and supplied with a pulse $F_{inv}$ which is shown in FIG. 2E of a period of 2H which is obtained by dividing the frequency of horizontal synchronizing signal H-SYNC by $\tfrac{1}{2}$ with a counter 31.

The time series signal subjected to the above phase processing results in a digital modulated color signal as is desired.

In FIG. 4, a horizontal blanking gate circuit 32 receives the output of the switching circuit 27 and supplies an output to an adder 34. A sync generator 33 generates a burst signal $F_{BU}$ and a composite synchronizing signal $F_{sy}$, and supplies an input to the adder 34 which mixes the above listed two signals. An aperture correcting circuit 40 receives the luminance signal Y and supplies it to a delay circuit 41 which corrects the phase of the luminance signal so that it matches the chroma signal. The digital luminance signal Y is added to the digital modulated color signal in mixer 42 so as to obtain the standard color television signal.

Figure 1B:
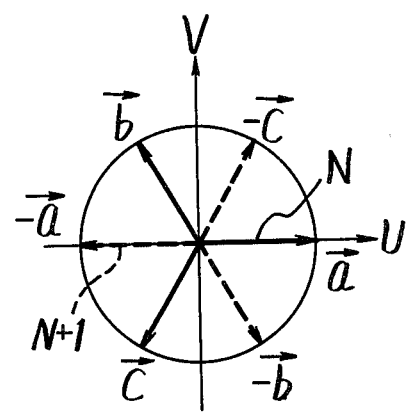
Figure 3:
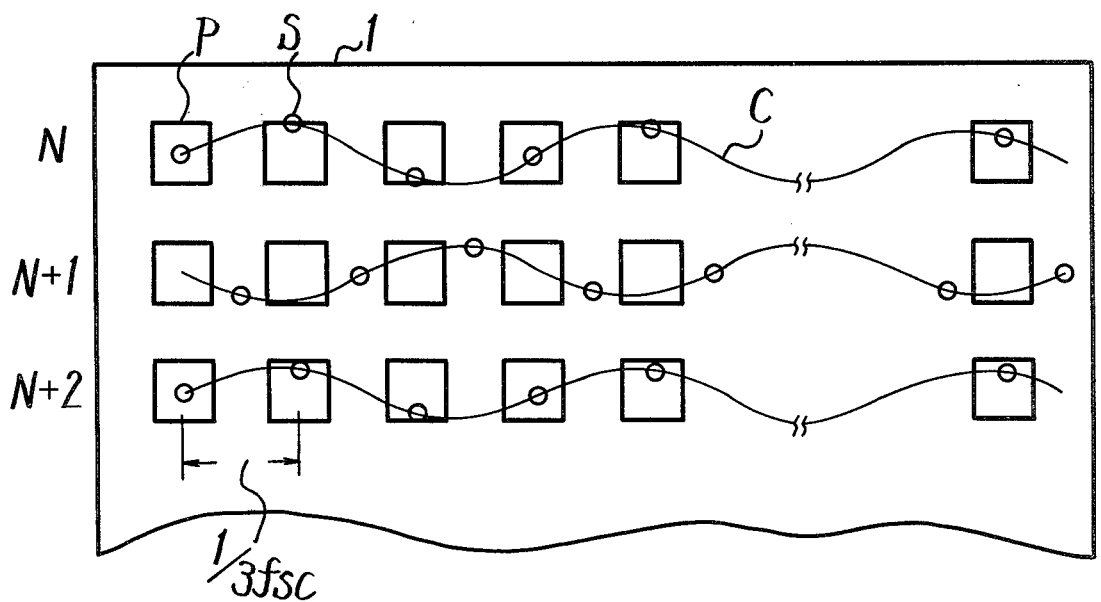
FIG. 3 is a view showing the relative positional relationship among the picture elements, the sampling carrier and the sampling point on the CCD chip.
Figure 5:
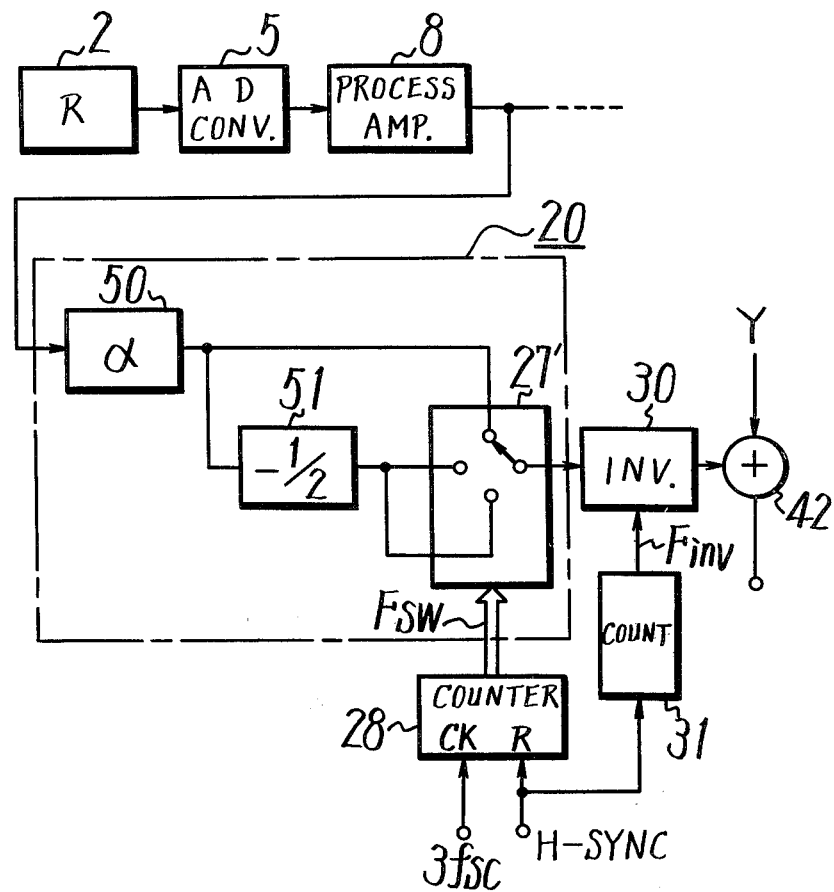
FIG. 5 illustrates another example of the main portion of the invention.
Figure 6:
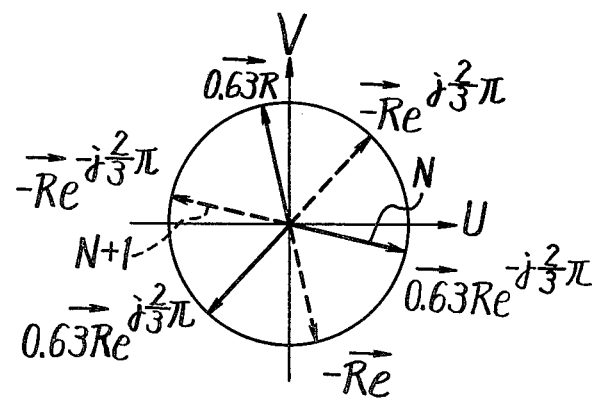
FIG. 6 is a plot illustrating the 3-phase modulating vectors.

In the above described embodiment, the carrier is modulated by the color difference signals. FIG. 5 illustrates an embodiment, however, where a primary color signal is used to modulate the carrier. It is to be realized, of course, that the other color signal may be used as well. The primary color modulating system of the type illustrated in FIG. 5 is effective when the color difference signals such as R−Y, B−Y and such signals are difficult to obtain. FIG. 5 shows a signal processing system using the red signal R and FIG. 6 illustrates the phase relationship of modulation vectors corresponding to FIG. 1B. A circuit 50 receives the output of processing amplifier 8 and multiplies it with a predetermined coefficient and supplies an output to switching circuit 27' as well as to another circuit 51 which multiplies its input with a coefficient $-\frac{1}{2}$. The circuit 51 supplies outputs to the switching circuit 27'. The switching circuit 27' is driven by the counter 28. In this embodiment, the phase invention is carried out at every 1H.

As described according to the invention, even though the phase relationship between the sampling pulses at the respective lines is changed according due to the picture element arrangement, a predetermined digital modulated color signal can be produced.

In the embodiments described above, the description was based on the example where the frequency of the sampling pulse is $3f_{sc}$. However, in the case where m does not equal 1 and n does not equal 1, a sampling rate converting circuit is provided to convert $n/m \times 3f_{sc}$ to $3f_{sc}$ so that the signal processing can be carried out with the above described circuits. The number of charge coupled devices that are used is also optional. In addition, the primary color signals of red, green and blue R, G and B are derived from the charge coupled devices 1, 2 and 3. However, this invention can also be utilized with a color television camera in which the signals of complementary colors as, for example, yellow, magenta and cyan are utilized.

Although the invention has been described with respect to preferred embodiments, it is not to be so limited as changes and modifications can be made which are within the full intended scope of the invention as defined by the appended claims.

We claim as our invention:

1. A digital color encoder for producing a digital color signal having a predetermined color phase, comprising:
   a. a digital signal producing means for delivering digital primary color signal components which have been sampled at a $3 \cdot (n/m) \cdot f_{sc}$ sampling rate, where $f_{sc}$ is the color subcarrier frequency and n and m are small integers,
   b. a digital color modulating circuit in which a carrier signal at $3f_{sc}$ is individually modulated with said digital primary color signal components at a first $\frac{2}{3}\pi$ offset carrier phase at N horizontal lines and a second $\frac{2}{3}\pi$ offset carrier phase at N+1 horizontal lines, where N is an integer, said first and second carrier phases having opposite phase relationship to each other,
   c. a signal inverter for phase inverting the output of said digital color modulating circuit during every one horizontal line interval, and
   d. a drive signal generator for driving said digital color modulating circuit and said digital signal producing means, and the outputs of said drive signal generator being synchronized with each other.

2. A digital color encoder according to claim 1, wherein said encoder further comprises a matrix circuit for producing a digital luminance signal by mixing the output signals of said digital signal producing means, and a digital mixer for mixing said digital luminance signal and the output signal of said inverter so that a composite digital color signal is obtained.

3. A digital color encoder according to claim 2, wherein said encoder has level adjusting circuits corresponding to the color components to be obtained with gains equal to the predetermined color signal ratio at the output terminal of said color modulating circuit.

4. A digital color encoder according to claim 3, wherein n and m are both 1 so that said signal producing means is driven by an output clock at a $3f_{sc}$ sampling rate.

5. A digital color encoder according to claim 4, wherein said digital signal producing means has solid state image pickup means for reproducing primary color signals and an analog-to-digital converters for converting said reproduced analog primary color signals to digital color signal components.

6. A digital color television camera including a digital color encoder for producing a digital color signal having a predetermined color phase, comprising:
   a. solid state image pickup means for reproducing a primary color signal,
   b. analog-to-digital converters for converting said reproduced primary color signal to digital color signal components,
   c. a digital color modulating circuit in which a carrier signal at $3f_{sc}$ is individually modulated with said digital color signal components at a first $\frac{2}{3}\pi$ offset carrier phase at N horizontal lines and a second $\frac{2}{3}\pi$ offset carrier phase at N+1 horizontal lines, where N is an integer and said first and second carrier phases having opposite phase relationship to each other,
   d. a signal inverter for phase-inverting the output of said digital color modulating circuit during every one horizontal line interval, and
   e. a drive signal generator for driving said digital color modulating circuit, said solid state image pickup means and analog-to-digital converter and the outputs of said drive signal generator being synchronized with each other.

* * * * *